United States Patent [19]

Bunce

[11] Patent Number: 5,734,753
[45] Date of Patent: Mar. 31, 1998

[54] PARTIAL PIXEL ENCODING AND DECODING METHOD

[75] Inventor: Richard W. Bunce, Boise, Id.

[73] Assignee: Hewlett-Packard Company, Palo Alto, Calif.

[21] Appl. No.: 521,682

[22] Filed: Aug. 31, 1995

[51] Int. Cl.[6] .................................................. H04N 1/41
[52] U.S. Cl. ........................... 382/237; 382/239; 358/429; 358/430
[58] Field of Search ................................ 382/237, 239, 382/232, 244, 245, 466; 358/429, 430, 426, 261.1, 261.2, 427, 456; 341/65, 67

[56] References Cited

U.S. PATENT DOCUMENTS

| | | | |
|---|---|---|---|
| 4,353,096 | 10/1982 | Sakurai | 358/429 |
| 4,532,503 | 7/1985 | Pennebaker | |
| 4,947,259 | 8/1990 | Katsuta | 358/429 |
| 4,965,843 | 10/1990 | Dorsselaer | 382/237 |
| 5,050,000 | 9/1991 | Ng | |
| 5,243,446 | 9/1993 | Pollich et al. | 358/429 |
| 5,453,843 | 9/1995 | Levy | 358/429 |

FOREIGN PATENT DOCUMENTS

| | | | |
|---|---|---|---|
| 0390533A2 | 3/1990 | European Pat. Off. | H04N 1/40 |
| 0496600A2 | 1/1992 | European Pat. Off. | H04N 1/40 |

*Primary Examiner*—Scott A. Rogers
*Attorney, Agent, or Firm*—Anthony J. Baca

[57] ABSTRACT

A method for partial pixel encoding and decoding of an extended resolution halftone image. The image is represented by a plurality of pixels and each pixel contains a number of sub-pixels. First, a group of pixels from the plurality of pixels is defined. The group of pixels is consolidated so that at most one pixel (i.e., a partial pixel) in the group has a sub-set of the plurality of sub-pixels set. Those fully-on or fully-off pixels in the group are stored in a bitmap. The corresponding bit in the bitmap is set if the partial pixel has more than half of its sub-pixels set otherwise it is reset. Next, the position of the partial pixel is stored in memory. Finally, an indicator is stored in memory, where the indicator in combination with the corresponding bit describe how many of the sub-pixels in the partial pixel are set. Decoding is performed in the reverse order.

16 Claims, 8 Drawing Sheets

| Sub-pixel | Coarse pixel | Error | Error bit pair |
|---|---|---|---|
| 0/0 | white | 0 | 00 |
| 1/7 | white | -1 | 01 |
| 2/7 | white | -2 | 10 |
| 3/7 | white | -3 | 11 |
| 4/7 | black | +3 | 11 |
| 5/7 | black | +2 | 10 |
| 6/7 | black | +1 | 01 |
| 7/7 | black | 0 | 00 |

PARTIAL PIXEL ENCODING AND DECODING METHOD

TECHNICAL FIELD

The present invention relates to digital halftoning and printing of continuous tone grayscale images; more particularly, to a method for efficiently encoding and storing the digital information representing halftoned images.

BACKGROUND OF THE INVENTION

In digital halftoning and printing of continuous tone grayscale images, a trade-off generally exists between the halftone resolution and the number of gray levels produced. Increasing resolution to attain greater edge detail causes a reduction in available gray levels, and a corresponding degradation in the depth and smoothness of gray contours. For example, on a 600 dpi printer moving from a 70 line per inch (@45 degrees) classic halftone screen to a 106 line per inch screen decreases the number of non-zero gray levels from 72 to 32. For additional information about digital halftoning see, Ulichney, R, Digital halftoning, ISBN 0-262-21009-6 (fourth printing 1993) incorporated herein by reference.

The most direct solution is to increase the printer resolution. For instance, migrating from a 600 dpi to a 1200 dpi printer will give four times the number of available gray levels. However, additional cost of the higher resolution print mechanism and the four times increased bitmap memory requirement is incurred.

Hardcopy raster output devices, such as inkjet and laser printers, may obtain additional gray levels by extending device resolution in the printhead or laser scan direction. Images halftoned at this extended resolution are of superior quality. However, the resulting halftones require proportionately greater memory and/or compression for their storage. A 600 dpi laser printer used as a 600 by 2400 dpi device, can print four times the number of gray levels for a given halftone screen. But the bitmap memory requirement is increased by four times, just as for 1200 dpi.

To avoid the increased bitmap memory cost of using extended resolution, an image can be halftoned in real time and sent to the printer without intermediate storage in a bitmap memory. However, other non-image elements may be present on a page, such as text and graphics. These may overlay, mask, incur, or otherwise logically operate upon halftone images and be stored in memory with them.

Data compression can be applied to a halftoned image to reduce bitmap memory requirements, with real time decompressed output sent to the printer. But operations with non-image page elements would require frequent decompression, modification, and recompression cycles that would seriously degrade performance. In addition, duplex (2-sided) page printing often accesses the bitmap memory in a reverse order, which most decompression schemes cannot do.

SUMMARY OF THE INVENTION

The present invention is a method for encoding an image. The image is represented by a plurality of pixels and each pixel contains a number of sub-pixels. First, a group of pixels from the plurality of pixels is defined. The group of pixels is consolidated so that at most one pixel (herein referred to as a partial pixel) in the group has a sub-set of the plurality of sub-pixels set to a first value. Those pixels in the group with all sub-pixels set and those pixels in the group with all sub-pixels reset are stored in a bitmap in memory. Finally, the partial pixel is encoded in memory.

To perform the encoding process, first the corresponding bit in the bitmap is set if the partial pixel has more than half of its sub-pixels set and reset if the partial pixel has less than half of its sub-pixels reset. Next, the position of the partial pixel is stored in memory. Finally, an indicator is stored in memory, where the indicator in combination with the corresponding bit describe how many of the sub-pixels in the partial pixel are set.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

The present invention uses extended resolution to dramatically improve halftoned image quality by providing (in its preferred embodiment) seven times the number of gray levels normally available for a given cluster dot halftone screen. The invention uses only two times the normal bitmap memory requirements to do so, without employing compression. Also, the invention is fully compatible with all non-image elements, such as text and graphics.

The present invention is not limited to a specific embodiment illustrated herein. Referring first to FIGS. 1A–1C, the main aspect of the preferred embodiment of the present invention is a secondary memory, equal in size to the normal bitmap memory. The normal bitmap memory contains the halftoned image at normal resolution, as well as non-image elements such as text and graphics. The secondary memory contains information of the difference between the normal resolution halftoned image and its corresponding extended resolution halftoned image. At print time this information is used to compensate the normal resolution image, thereby restoring extended resolution as the image is being printed.

In the following description of the preferred embodiment, the "partial pixel encoding" method uses a normal 600 dpi bitmap memory along with a secondary memory of equal size to store a 600 by 4200 dpi extended resolution halftoned image.

The basis of partial pixel encoding is depicted in FIGS. 1A–1C. The higher resolution information of an extended resolution (600 by 4200 dpi) cluster dot is contained in the partial pixels at its edges, while other pixels can be represented at a coarser resolution. Partial pixel encoding divides a halftoned image into two components. The first is a course representation of the image at the normal output device resolution (600 dpi), FIG. 1B. It resides in the normal bitmap memory, along with any non-image elements of the page. The second component is the partial pixel difference between the course representation and the extended resolution image, FIG. 1C; it is encoded in a secondary memory.

Partial pixel encoding is a one-dimensional (line) process. It operates on four consecutive 600 dpi pixel positions at a time (herein referred to as a group). While a two-dimensional application is possible, most image processing (including halftoning) and storage is done on a line-by-line basis. FIG. 2 depicts the first step in encoding the top line of the dot cluster of FIG. 1A. The full-on (7/7) and full-off (0/7) pixels are stored in the normal bitmap nibble, and are exactly represented.

FIG. 3 depicts the partial pixel encoding. Because each pixel is divided into 7 sub-pixels, 128 different bit combinations are possible. However, a partial-pixel is interpreted as an aggregate gray level, with a range from 1/7 to 6/7 pixel. Thus, the partial pixel encoding needs to only encode 6 levels.

Encoding first sets the corresponding course pixel based on the number of sub-pixels set. If the number of sub-pixel set is greater than 3, then the corresponding course pixel in the normal bitmap nibble is set. Conversely, if the number of sub-pixel set is less than 4, then the corresponding course pixel is reset. Referring to FIG. 3, pixel 300 has 3 sub-pixels set. Because partial pixel 300 has less than 4 sub-pixels set, the corresponding course pixel 303 is reset.

Next, the error between the course pixel and the partial-pixel, represented by the error bit pair of the encoded nibble, is encoded. The error between partial-pixel 300 and pixel 303 is defined as:

(Course pixel)−(Partial-Pixel)=0−3=−3

Figure 1:
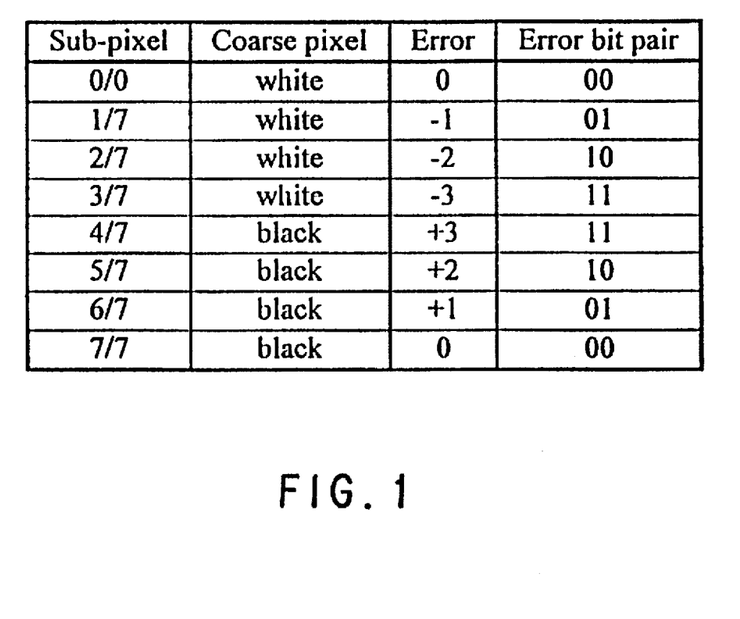
FIG. 1 shows a table relating error to encoding bit pair.
Figures 1A, 1B, 1C, 2, 3, 4, 5:
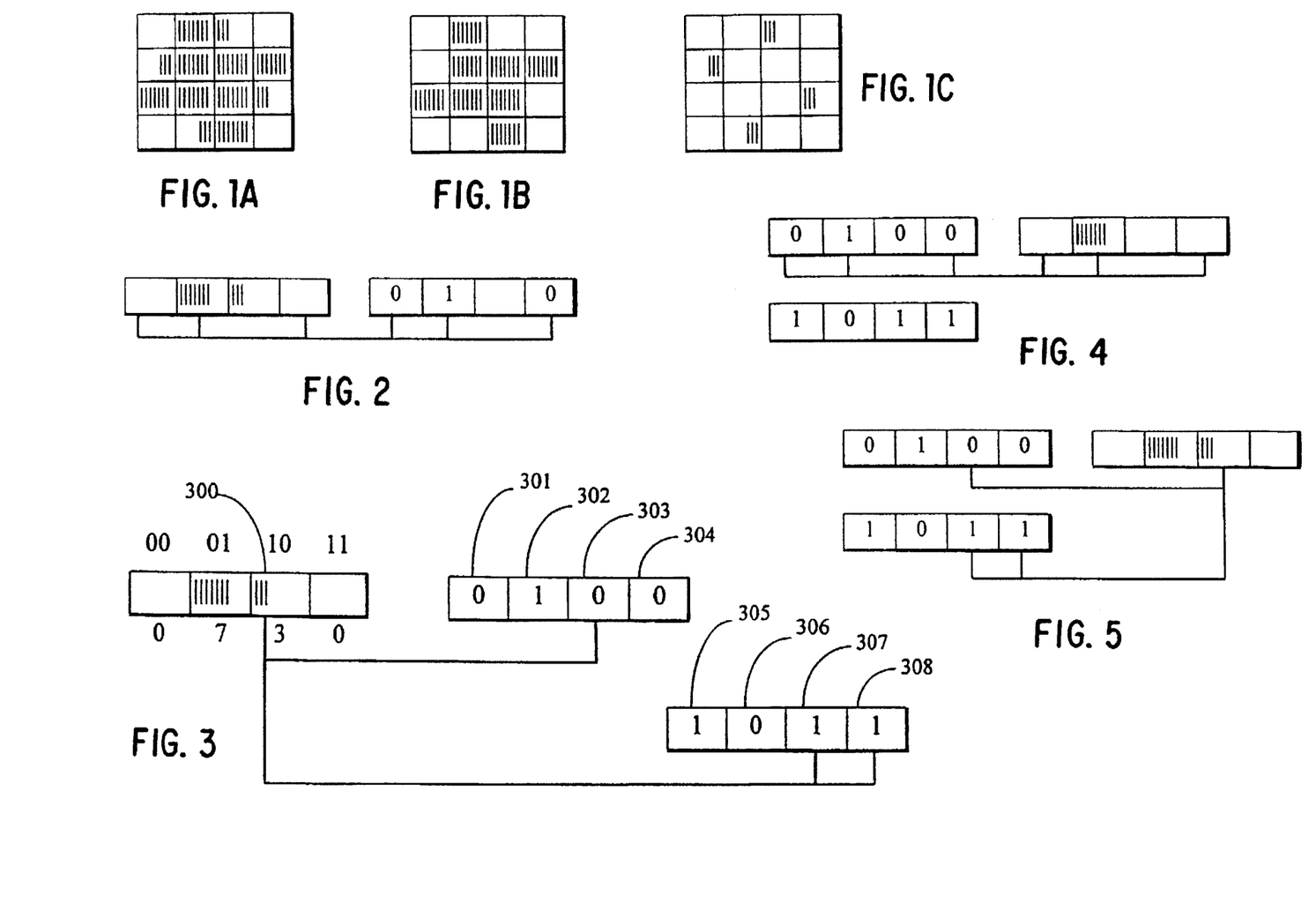
FIG. 1A shows an extended resolution halftone dot cluster.
FIG. 1B shows the full pixels in the cluster of FIG. 1A.
FIG. 1C shows the edge partial-pixels in the cluster of FIG. 1A.
FIG. 2 shows how full pixel information is stored in the bitmap nibble.
FIG. 3 illustrates the partial-pixel encoding including the bitmap nibble, sub-pixel error and partial pixel position.
FIG. 4 illustrates that full pixels pass unmodified during the decoding process.
FIG. 5 illustrates how the partial pixel information is decoded.

Referring to FIG. 1, the table 1 shows that an error of −3 is encoded with a "11" bit pair. This encoded bit pair is then stored in error bit pair 307 and 308.

Finally, the position of the partial pixel is stored in the encoded nibble. Assuming that the left most pixel position is 0 and the right most is 3, the two bit binary number representing the pixel position is stored in the first two bits of the encoded nibble. To complete the example of FIG. 3, the partial pixel, which is encoded in the rate pair, originally came from pixel location 2. Therefore the binary number 2 (10) is encoded in locations 305 and 306.

Note that a zero encoded nibble value indicates zero error, i.e., no partial pixels are present. Consequently, non-image elements such as text need no encoding (assuming encoded nibbles are initialized to zero); they are exactly represented in the normal bitmap.

FIGS. 4 and 5 illustrate the decoding process. During the decoding process, normal bitmap pixels are passed unmodified. Consequently, non-image elements such as text need no decoding because they are exactly represented in the normal bitmap. For a non-zero encoded nibble, the pixel position of the partial pixel is indicated by the left bit pair. The other three pixel positions are, by definition, full pixels and are passed unmodified as shown in FIG. 4.

FIG. 5 depicts the partial pixel decoding. The number of sub-pixels in a partial pixel is determined from the course pixel in the normal bitmap nibble and the error bit pair in the encoded nibble (the reverse of the mapping described above for encoding). Note that the lost information pertaining to the partial pixel's original shape has been restored. Partial pixel decoding attempts to recover this information, based on the assumption of dot clusters. The decoder will either left or right align the sub-pixels, based on the state of adjacent full pixels in the bitmap nibble, to extend a course image edge. When no adjacent course image edge is detected, default alignments are used.

One skilled in the art will notice that partial pixel encoding described above only supports one partial pixel occurrence in the four pixel positions it operates upon. But multiple partial pixel occurrences in a four pixel period can and do appear in extended resolution halftoning. There are two causes for this; (1) by design in the halftone threshold (dither) array; (2) by intensity gradients in the continuous tone source image.

Figure 6A:
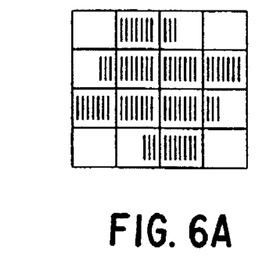
FIG. 6A shows a compatible extended resolution dot cluster.
Figure 6B:
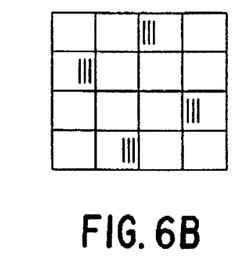
FIG. 6B shows the edge partial-pixels in the cluster of FIG. 6A.
Figure 6C:
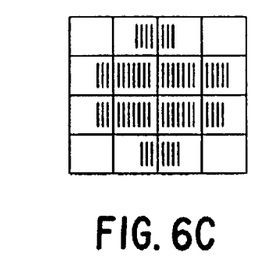
FIG. 6C shows an incompatible extended resolution dot cluster.
Figure 6D:
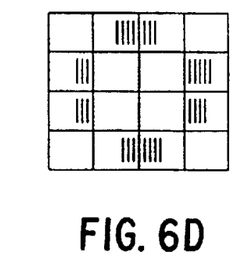
FIG. 6D shows the edge partial-pixels in the cluster of FIG. 6C.

FIGS. 6A and 6B show clusters produced by compatible threshold arrays and their partial pixel components respectively, while FIGS. 6C and 6D show clusters produced by incompatible threshold arrays and their partial pixel components.

Halftone threshold arrays that are compatible with partial pixel encoding can be designed. The only constraint is that, for any constant gray level, partial pixels in the resulting halftone clusters have at least three full pixels separating them in the processing (line) direction. Even with this constraint, compatible threshold arrays for halftone screen frequencies up to 212 lines per inch @45 degrees can be generated (assuming 600 dpi normal resolution).

Even with a compatible threshold array, intensity gradients in the source image can still cause multiple partial pixel occurrences. The solution is a partial pixel consolidation filter used before encoding. If multiple partial pixels exist, the filter "grows" the largest one at the expense of the nearest neighboring partial pixels until it is either a full pixel or the only remaining partial pixel. The filter process is iterated until no-more than one partial pixel remains.

Partial pixel consolidation does not perceivably degrade halftone image quality. For intensity gradients large enough to cause multiple partial pixels, the intensity changes significantly over the period of the threshold array and therefore cannot be accurately represented anyway, so the additional impact of partial pixel consolidation is negligible.

While it is possible to iteratively consolidate all four pixels, the preferred embodiment operates on two pixels at a time. Such an approach is based on the understanding that two partial pixels can "condense" into one by increasing the larger partial pixel, while proportionately decreasing the smaller, until either the larger is a full-on pixel or the smaller is a full-off pixel. Details of the consolidation operation are shown in the FIG. 11. The condense sub-routine used by the consolidation operation is shown in the FIG. 12. Note, when partial pixels are equal, a default (b) is chosen as the larger. Also note that the condense operation has no effect if either pixel is not a partial pixel.

The consolidation filter condenses the left pixel pair and the right pixel pair, yielding at most two partial pixel instances. If two partial pixels remain, the filter then condenses them into one, or zero, partial pixel instances. At that point consolidation is complete, and encoding can be performed. Though described here as a sequence, the consolidation filter can be implemented in a single pass with a combinational logic circuit, hardware ROM, or software lookup table.

Figure 11:
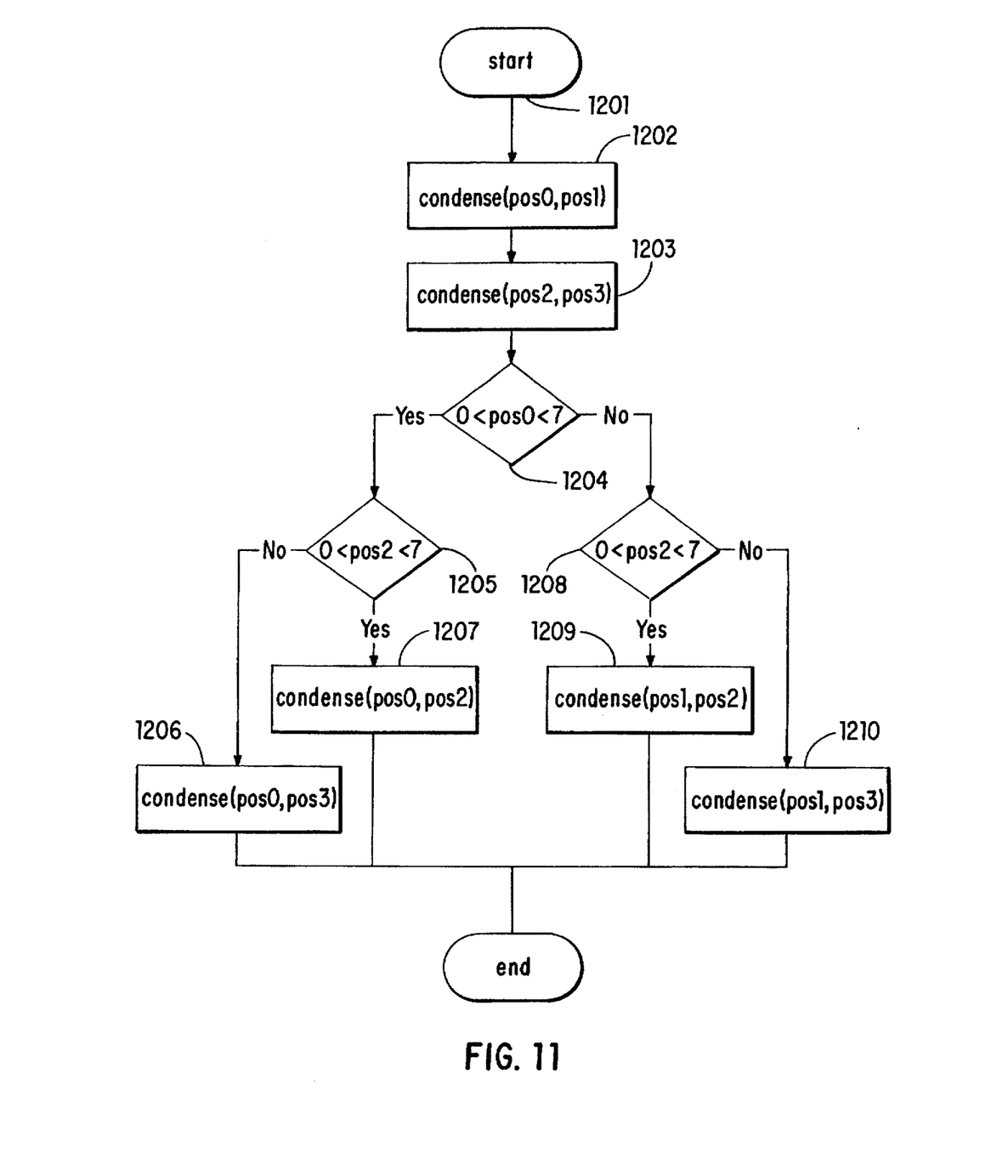
FIG. 11 is a flowchart showing an embodiment for the consolidation process.

With renewed reference to FIG. 11, first, the left pixel pair (position 0, position 1) are condensed 1202. Next, the right pixel pair (position 2, position 3) are condensed 1203. After these two initial pixel pairs are condensed at most two partial pixels remain. To determine if more than one partial pixel remains, position 0 is checked to determine if it is a partial pixel 1204. Assuming pixel 0 is a partial pixel, it is condensed with any remaining partial pixels. First, pixel 2 is tested to determine if it is a partial pixel 1205. If pixel 2 is not a partial pixel than pixel 0 is condensed with pixel 3 1206. Alternatively, if pixel 2 is a partial pixel 1205, then partial pixels 0 and 2 are condensed 1207. If pixel 0 was not a partial pixel 1204, then it is assumed that pixel 1 is a partial pixel. Pixel 2 is checked to determine if pixel 2 is a partial pixel 1208. Assuming pixel 2 is not a partial pixel, then pixel 1 is condensed with pixel 3 1210. Alternatively, if pixel 2 is determined to be a partial pixel 1208, then pixel 1 is condensed with pixel 2 1209.

Thus in the preferred embodiment, the four pixels are first divided into two groups. Each group is then sent to the condense subroutines, which will be described shortly. Condense returns at most one partial pixel. After condensing the first 2 pixel pairs, each pixel is tested to determine if it is a partial pixel. Any partial pixels are then passed to condense which further condenses the remaining partial pixels.

Figure 12:
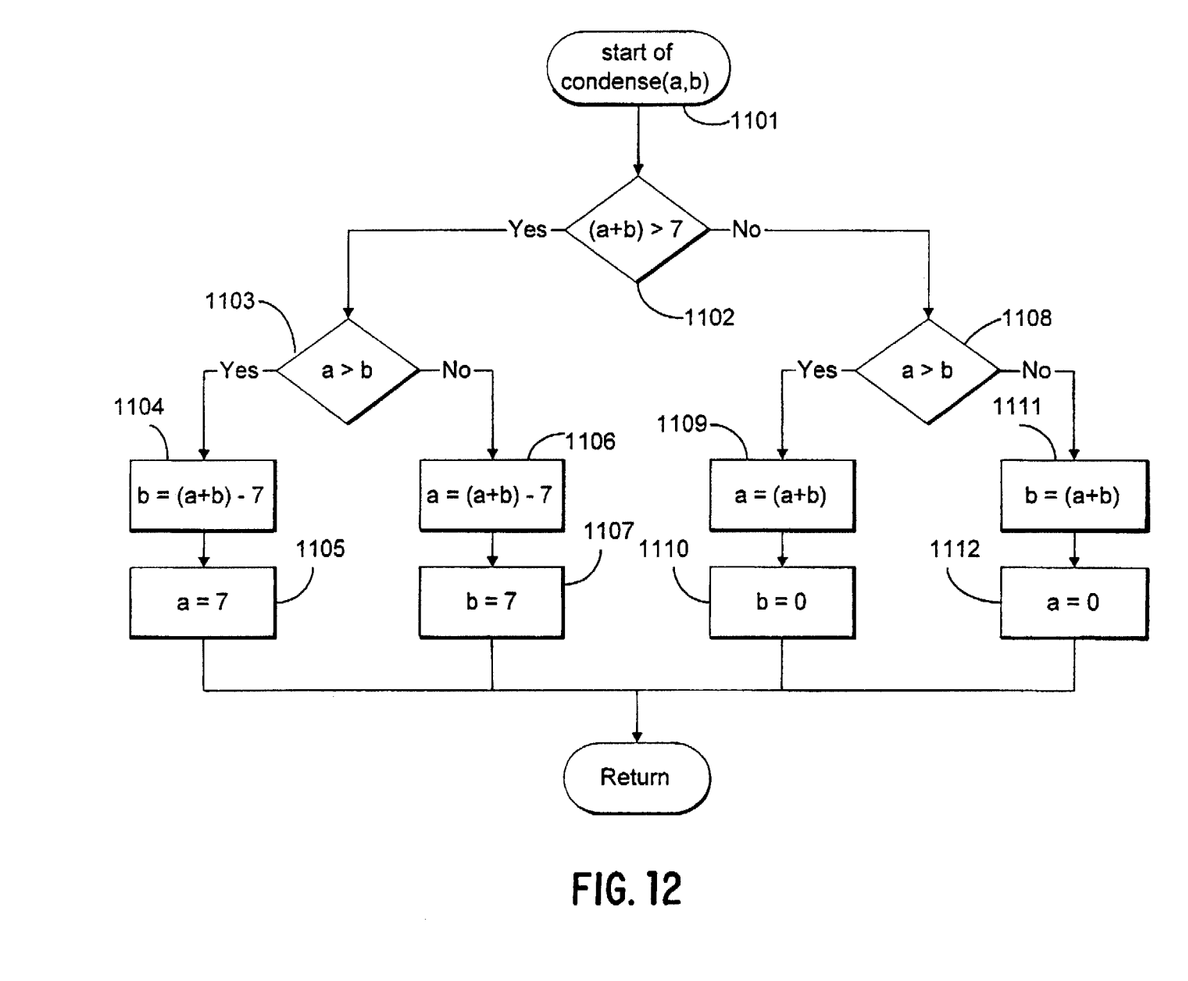
FIG. 12 is a flowchart of a subroutine used by the embodiment of FIG. 11.

Referring now to FIG. 12, first, a determination is made whether as a result of the Condense procedure one complete pixel will be generated or one empty pixel will be generated 1102. Assuming one full pixel will be determined, because there are greater than seven sub-pixels, next it is determined which pixel contains the larger number of sub-pixels. 1103.

If pixel A has more sub-pixels then pixel B, then B is equated to be sum of A plus B-7 1104. And A is designated as being full 1105. In essence, enough sub-pixels are transferred from pixel B into pixel A to fully populate pixel A. In a similar manner, if pixel B was originally determined to be the larger pixel 1103, then enough sub-pixels are transferred from A 1106 to fully populate pixel B 1107.

If the first step determined that at least one empty pixel will be generated 1102, then first it must be determined which pixel presently contains the larger number of sub-pixels 1108. If pixel A is determined to hold the larger number of sub-pixels, then all the sub-pixels in B are transferred to pixel A 1109, thereby deleting all sub-pixels in B 1110. Alternatively, if it is determined that B originally contains more sub-pixels then pixel A, 1108 then all sub-pixels are transferred from pixel A into pixel B 1111, thereby deleting pixel A 1112.

Figure 7A:
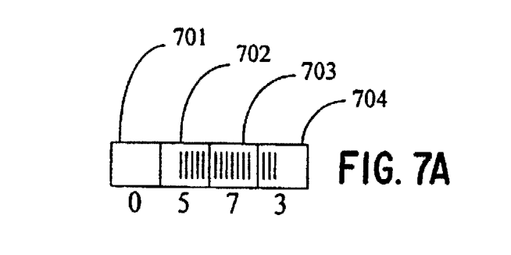
FIG. 7A and 7B show a simple partial-pixel consolidation.
Figure 7B:
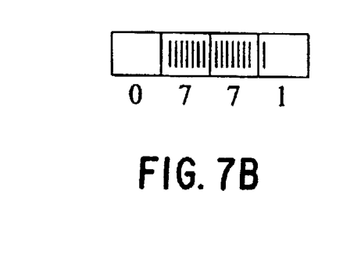

With the aid of FIG. 7, an example of the consolidation procedure may aid the user in better understanding the present invention. As shown in FIG. 7, pixel position 701 is empty, position 702 contains five sub-pixels, position 703 contains seven sub-pixels, and pixel 704 contains three sub-pixels. If the present invention attempts to encode this group, pixel 703 is fully occupied and therefore completely represented in the bitmap. However, two partial pixels (702, 704) remain. As has been described during the discussion of FIG. 6, the present invention is unable to encode more than one partial pixel per group. Therefore, the group of FIG. 7 must be consolidated.

Referring simultaneously to FIGS. 7A, 7B, 11 and 12, the consolidation process of FIG. 11 will be used to consolidate the group of FIG. 7A. First, pixels 701 and 702 are passed to the condense subroutine 1202. Referring to FIG. 12, it is first determined that pixels 701 and 702 contain less than seven sub-pixels 1102. Therefore, the next test is to determine which pixel contains the most number of sub-pixels 1108. Here, pixel 702 contains five sub-pixels therefore, b 1108. Here, pixel 702 contains five sub-pixels therefore, b (702) has a larger number of sub-pixels than pixel a (701). In 1111, the contents of pixels 701 and 702 are combined and stored in pixel b (702). Also, pixel a (701) is set to zero 1112. Upon return of condense subroutine, one skilled in the art will see that the sub-pixel contents of pixels 701 and 702 has not changed. Next, pixels 703 and 704 are passed to the condense subroutine 1203. Following the logic of the condense subroutine in FIG. 12, it can be seen that the contents of pixels 703 and 704 are also not changed.

Next, referring back to FIG. 11, position 0 is tested to determine whether it is a partial pixel. In the present example, position 0 (701) contains zero sub-pixels therefore, decision box 1204 is false. Next, in 1208, position 2 (703) is tested to determine whether it is a partial pixel. Here, pixel 2 (703) is a full pixel, therefore, pixel 1 (702) and pixel 3 (704) are passed to the condense subroutine 1210. In the condense subroutine as shown in FIG. 12, it is first determined whether the combination of the two partial pixels sent contain greater than seven sub-pixels 1102. Next, it is determined which pixel contains the larger number of sub-pixels 1103. In the present example, pixel a (702) has a greater number of sub-pixels than pixel b (704) thus, pixel b (704) is filled in accordance with the equation of 1104 and pixel a (702) is fully populated with seven sub-pixels 1105. FIG. 7B shows the end result of the consolidation process of FIG. 11.

Figure 8A:
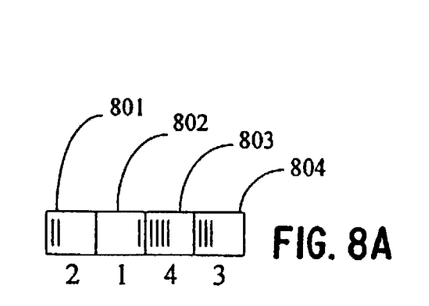
FIGS. 8A and 8B show a more complicated partial-pixel consolidation.

The consolidation process as shown in FIG. 7 represents a fairly simple arrangement. More complicated arrangements, such as those shown in FIG. 8A, are possible. As shown in FIG. 8A, pixel 801 contains two sub-pixels, 802 contains one sub-pixel, pixel 803 contains four sub-pixels, and pixel 804 contains three sub-pixels. With renewed reference to FIG. 11, first, pixels 801 and 802 are passed to the condense subroutine 1202. Upon return for, pixel 801 contains three sub-pixels and pixel 802 is empty. Next, pixels 803 and 804 are condensed in 1203. As a result of the condense subroutine, pixel 803 now contains seven sub-pixels making it a fully populated pixel, additionally, pixel 804 is empty.

Figure 8B:
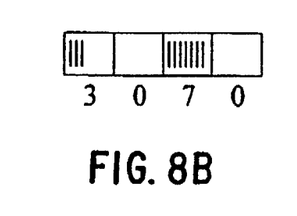

One skilled in the art would see that after returning from the condense subroutine 1203, the group of FIG. 8 is fully condensed, however, in the embodiment of FIG. 11, no check is made to determine if further processing is necessary. Such a modification to the embodiment of FIG. 11 could easily be made by one skilled in the art. Continuing with the embodiment of FIG. 11, position 2 (803) contains seven sub-pixels, therefore positions 0 (801) and 3 (804) are passed to the condense subroutine 1206. Because position 3 is empty, no change is made and the group as shown in FIG. 8B is fully consolidated.

Though described here sequentially, the filter can be implemented in a single pass with a combination logic circuit or software look-up table. Both partial pixel consolidation and subsequent encoding use the aggregate gray level (0/7 to 7/7) of four pixels as their input operands. Therefore, both functions can be combined into a single pass, 12-bit input look-up table or combinational logic circuit. Partial pixel decoding has two nibbles for its input operands, and can be implemented in an 8-bit input look-up table or combinational logic circuit.

Figure 9:
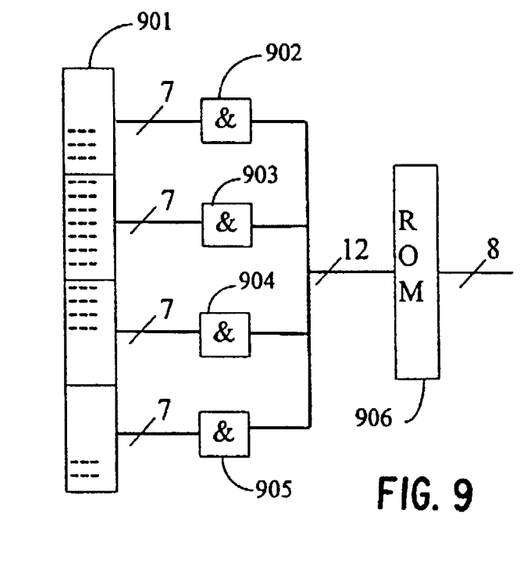
FIG. 9 is a block diagram of a hardware embodiment to perform the encoding portion of the present embodiment.

Referring now to FIG. 9, where an exemplary hardware embodiment realizing the present invention is shown. Each pixel, which includes 7 sub-pixels, is presented to an adder 902-905. It should be noted, that normally a 7 bit number may represent 128 possible combinations, however, in the embodiment shown in FIG. 9, each pixel grows sequentially, therefore each pixel has only 8 possible combinations. For example, adder 902 translates the seven incoming bits into a binary number that represents the number of sub-pixels set. Thus, adder 902 outputs a binary number 3 because there are 3 sub-pixels set. In a similar manor, adder 903 outputs binary 7, adder 904 outputs binary 4, and adder 905 outputs binary 2.

Figure 10:
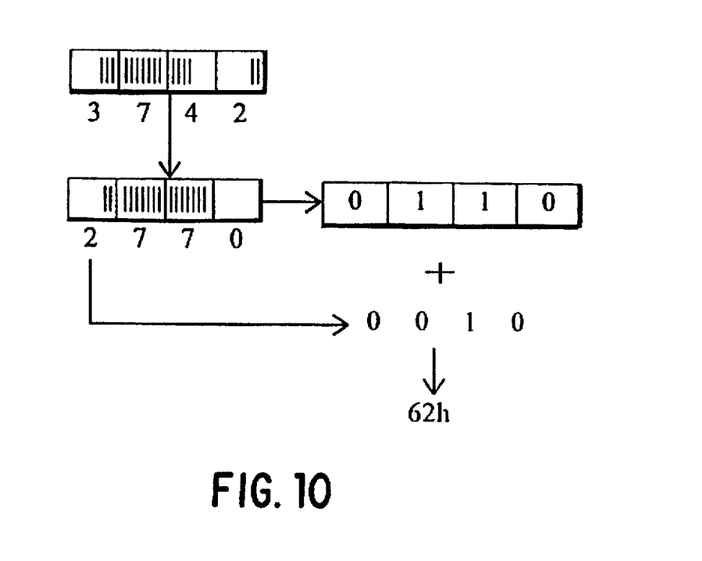
FIG. 10 graphically illustrates the consolidation and encoding process and the resultant number stored in the ROM of FIG. 9.

One skilled in the art will realize that each added output can accurately represent the eight possible inputs with a 3 bit binary number. Thus, if adder 902-905 are combined, a total of 12 bits are generated. This 12 bit number is then used as an address into ROM 906. Using the data from group 901 and assuming adder 905 outputs the least-significant bit, the 12 bit number is 07E2 (HEX). Finally, ROM 906 outputs a single byte wherein the single byte contains two nibbles. A first nibble contains the normal bitmap information, while the second nibble contains the corresponding encoded information as previously described. To complete the example, the contents of ROM 906 location 07E2 contains 62 h, where the 6 (0110b) is the normal bitmap and 2 (0010b) is the partial pixel encoding. FIG. 10 shows in discrete steps, first the consolidation of group 901 and then the encoding of the partial pixel information.

Figure 14:
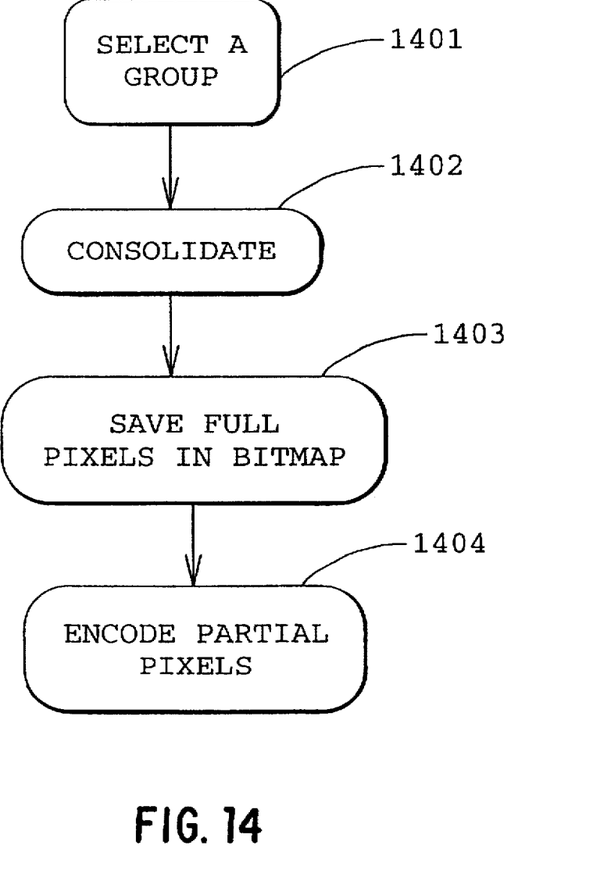
FIG. 14 is a flow chart showing the preferred embodiment in accordance with the present invention.

Referring briefly to FIG. 14 where a flowchart showing the logical steps used to perform the present invention. Given a particular group 1401, it must be consolidated as described above 1402. Next, any full pixels are stored in the memory unmodified 1403. Finally, the remaining partial pixel is encoded and stored in the memory 1404.

Partial pixel decoding uses two nibbles for its operands thus, it can be implemented in an 8-bit input look-up table or combinational logic circuit similar to that used to encode. Two additional bits may be used to access individual pixels from the four decoded. See FIG. 13 for one possible embodiment for the decoder. Data Memory 1301 outputs an 8-bit number that contains the bitmap (0100) in the first nibble and the sub-pixel encoding(1011) in the second nibble. ROM 1302 shown as a 1024×7 matrix could also be a 256×28, however, some applications may need access to the individual pixels in a more controlled arrangement. Thus, the embodiment of FIG. 13 uses two additional bits to address individual pixel contents. Given the input 01001011 b, each pixel contents is shown in 1303-1306.

Figure 13:
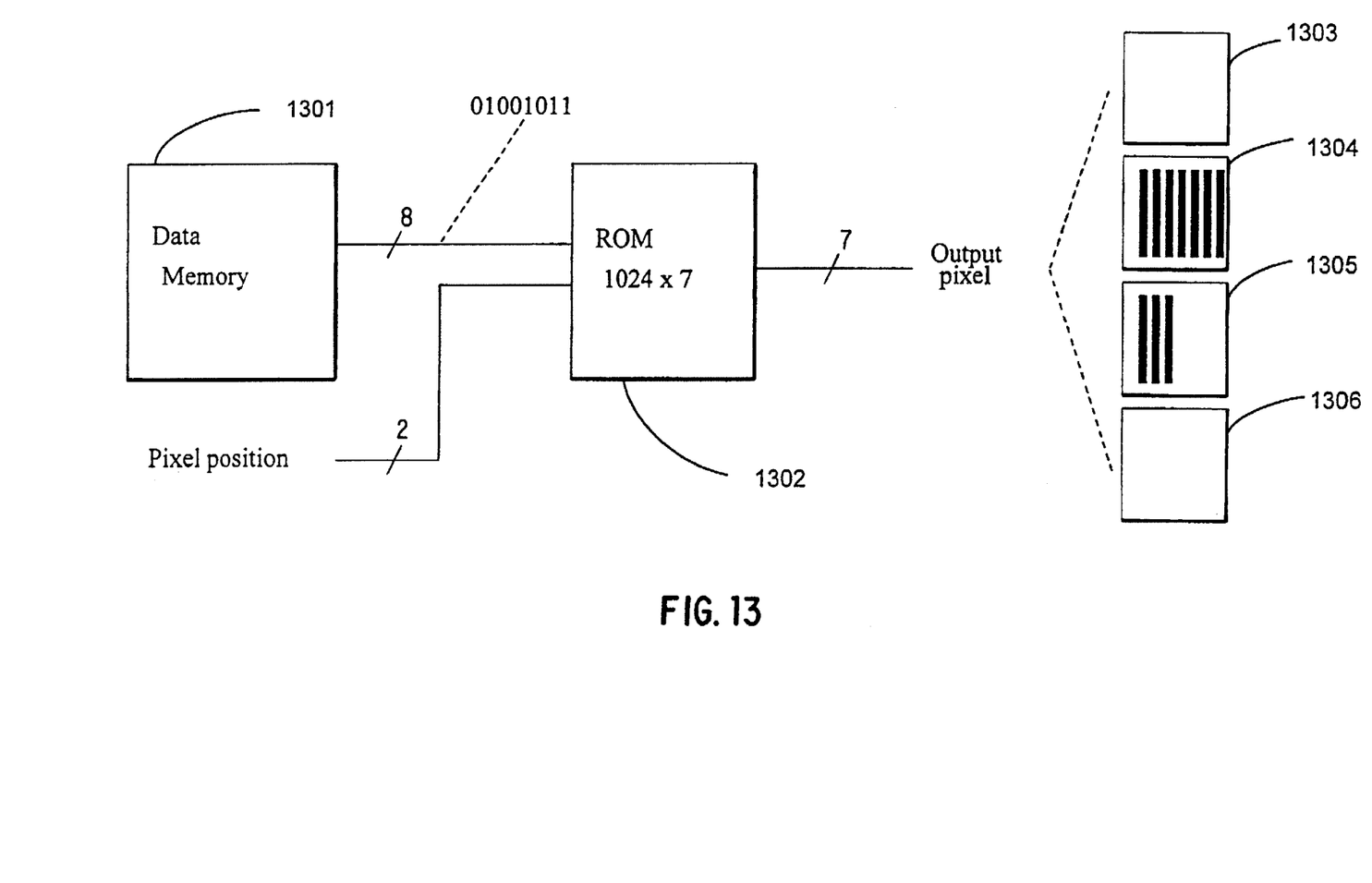
FIG. 13 is a block diagram of a hardware embodiment to perform the decoding portion of the present embodiment.

While not shown, one skilled in the art would be able to generate software programs that operate in a similar manor to the hardware embodiment of FIGS. 9 and 13. It should also be apparent that these programs could be used to generate the required look-up tables for the 4096 possible consolidation/encode input combinations and the 256 possible decode input combinations. The look-up tables can then be stored in the ROMs for the hardware embodiment or as part of the programs in the software embodiment.

One skilled in the art could modify, thereby simplifying, the consolidation process by accepting some compromise in image quality. For example, multiple partial pixels in a group could be resolved by only encoding error and location information on the largest, discarding information on the others. As another example, all partial pixel information in a group could be discarded if more than one partial pixel occurs.

Figure 15:
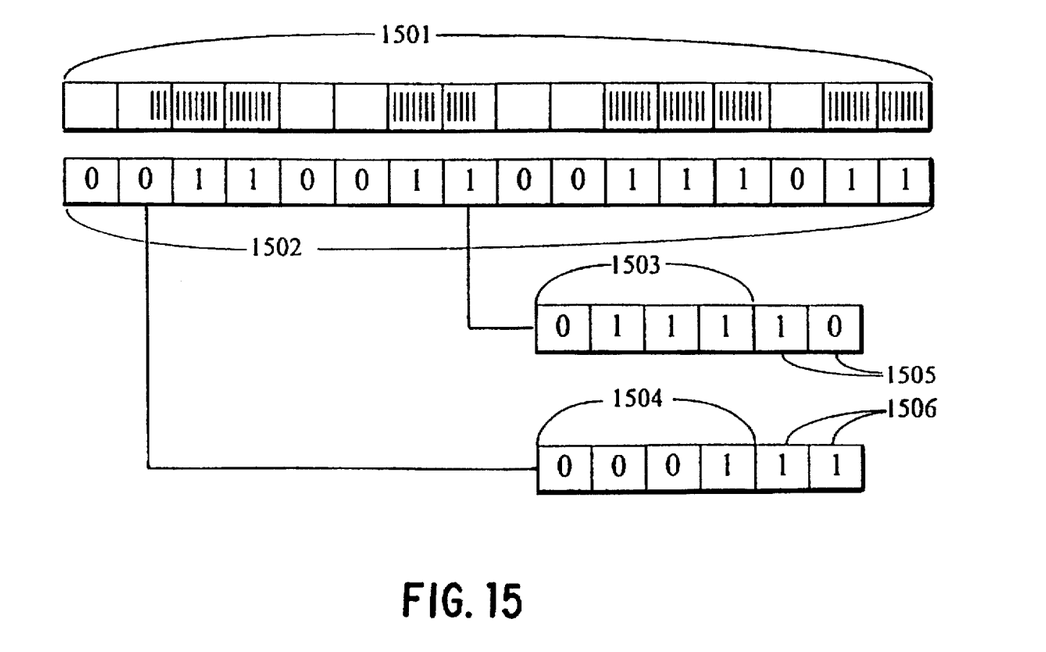
FIG. 15 illustrates the partial-pixel encoding including the bitmap nibble, sub-pixel error and partial pixel position for an alternative embodiment.

Additionally, one skilled in the art could encode multiple partial pixels that are a subset of a larger group of pixels. For example, a group of 16 pixels could contain two partial pixels if 12 bits (to encode two positions at four bits each, and two error bit pairs) are used. A corresponding partial pixel consolidation process would terminate when no more than two partial pixels remain. A example of such a modification is shown in FIG. 15. The original 16 pixels 1501 are first encoded in a bitmap 1502. The location of the first partial pixel, which is in position 1, is stored in four bits 1504. A second partial pixel's position (7) is stored in four bits 1503. Two error bit pairs are stored in 1505 and 1506, one for each partial pixel.

Although the preferred embodiment of the invention has been illustrated and that form described, it is readily apparent to those skilled in the art that various modifications may be made therein without departing from the spirit of the invention or from the scope of the appended claims.

TABLE 1

| Sub-pixel | Coarse pixel | Error | Error bit pair |
|---|---|---|---|
| 0/0 | white | 0 | 00 |
| 1/7 | white | −1 | 01 |
| 2/7 | white | −2 | 10 |
| 3/7 | white | −3 | 11 |
| 4/7 | black | +3 | 11 |
| 5/7 | black | +2 | 10 |
| 6/7 | black | +1 | 01 |
| 7/7 | black | 0 | 00 |

What is claimed is:

1. A method for encoding an image, said image being represented by a plurality of pixels where each pixel containing a plurality of sub-pixels, said method comprising the steps of:

defining a group of pixels from said plurality of pixels;

consolidating said group of pixels so that at most one pixel in said group has a sub-set of said plurality of sub-pixels set to a first value;

representing in a memory those pixels in said group with all sub-pixels set to a first value by a first indicator and those pixels in said group with all sub-pixels set to a second value by a second indicator; and encoding into said memory, if present, said at most one pixel.

2. The method of claim 1 further comprising the steps of:

decoding from memory said at most one pixel; and extracting said group of pixels.

3. The method of claim 1 wherein said step of encoding further comprising the step of:

storing in said memory said at most one pixel's position in said group and how many of said sub-pixels in said at most one pixel are set to said first value.

4. The method of claim 1 wherein said step of representing stores in said memory a bitmap representation of said group, said step of encoding further comprising the steps of:

setting a corresponding bit in said bitmap to said first value if said sub-set is more than half of said plurality of sub-pixels, in the alternative, setting said corresponding bit to said second value if said sub-set is less than half of said plurality of sub-pixels;

first storing in said memory said at most one pixel's position in said group; and second storing in said memory a third indicator, said third indicator in combination with said corresponding bit describe how many of said sub-pixels in said at most one pixel are set to said first value.

5. The method of claim 1 wherein said step of representing stores in said memory a bitmap representation of said group, said step of encoding further comprising the steps of:

setting a corresponding bit in said bitmap to said first value if said sub-set is equal to half of said plurality of sub-pixels, setting a corresponding bit in said bitmap to said first value if said sub-set is more than half of said plurality of sub-pixels, setting said corresponding bit to said second value if said sub-set is less than half of said plurality of sub-pixels;

first storing in said memory said at most one pixel's position in said group; and second storing in said memory a third indicator, said third indicator in combination with said corresponding bit describe how many of said sub-pixels in said at most one pixel are set to said first value.

6. The method of claim 1 wherein said step of representing stores in said memory a bitmap representation of said group, said step of encoding further comprising the steps of:

setting a corresponding bit in said bitmap to said first value if said sub-set is more than half of said plurality of sub-pixels, setting a corresponding bit in said bitmap to said second value if said sub-set is equal to half of said plurality of sub-pixels, setting corresponding bit to said second value if said sub-set is less than half of said plurality of sub-pixels;

first storing in said memory said at most one pixel's position in said group; and second storing in said memory a third indicator, said third indicator in combination with said corresponding bit describe how many of said sub-pixels in said at most one pixel are set to said first value.

7. A method for encoding an image, said image being represented by a plurality of pixels where each pixel containing a plurality of sub-pixels, said method comprising the steps of:

defining a group of pixels from said plurality of pixels;

representing in a memory those pixels in said group with all sub-pixels set to a first value by a first indicator and those pixels in said group with all sub-pixels set to a second value by a second indicator; and encoding into said memory, if present, a position and number of sub-pixels set to said first value for any remaining pixels.

8. The method of claim 7 further comprising the steps of:

consolidating said group of pixels so that at most one pixel in said group has a sub-set of said plurality of sub-pixels set to a first value; and said encoding only encoding said at most one pixel.

9. A method for encoding and decoding an image, said image being represented by a plurality of pixels where each pixel containing a plurality of sub-pixels, said method comprising the steps of:

defining a group of pixels from said plurality of pixels;

representing in a memory those pixels in said group with all sub-pixels set to a first value by a first indicator and those pixels in said group with all sub-pixels set to a second value by a second indicator;

encoding into said memory, if present, a position and number of sub-pixels set to said first value for any partial pixels where said partial pixels have a sub-set of said plurality of sub-pixels set to said first value;

decoding from memory said partial pixels; and extracting said group of pixels.

10. The method of claim 9 wherein said group containing M pixels, said method further comprising the steps of:

consolidating said group of pixels so that at most N partial pixels remain, where N is less than M; and said encoding only encoding said N partial pixels.

11. The method of claim 9 further comprising the step of:

consolidating said group of pixels so that one partial pixel remains; and said encoding only encoding said partial pixel.

12. The method of claim 11 wherein said step of encoding further comprising the steps of:

storing in said memory said partial pixel's position in said group and how many of said sub-pixels in said partial pixel are set to said first value.

13. The method of claim 11 wherein said step of representing stores in said memory a bitmap representation of said group, said step of encoding further comprising the steps of:

setting a corresponding bit in said bitmap to said first value if said sub-set is more than half of said of said plurality of sub-pixels, in the alternative, setting said corresponding bit to said second value if said sub-set is less than half of said plurality of sub-pixels;

first storing in said memory said partial pixel's position in said group; and second storing in said memory a third indicator, said third indicator in combination with said corresponding bit describe how many of said sub-pixels in said partial pixel are set to said first value.

14. The method of claim 13 wherein said step of decoding further comprising the steps of:

first retrieving from said memory said third indicator;

second retrieving from said bitmap said corresponding bit; and determining said position and number of sub-pixels in said partial pixel from said third indicator and said corresponding bit.

15. The method of claim 10 wherein said step of representing stores in said memory a bitmap representation of said group, said step of encoding further comprising the steps of:

for each of said N partial pixel, setting a corresponding bit in said bitmap to said first value if said sub-set for a corresponding partial pixel is more than half of said of said plurality of sub-pixels, in the alternative, setting said corresponding bit to said second value if said sub-set is less than half of said plurality of sub-pixels;

first storing in said memory said N partial pixels' position in said group; and second storing in said memory a third indicator, said third indicator in combination with said corresponding bit describe how many of said sub-pixels in each of said N partial pixel are set to said first value.

16. The method of claim 15 wherein said step of decoding further comprising the steps of:

first retrieving from said memory said third indicator;

second retrieving from said bitmap each said corresponding bit; and determining said position and number of sub-pixels for each of said N partial pixels from said third indicator and each said corresponding bit.

* * * * *